US010963652B2

United States Patent
Hashimoto et al.

(10) Patent No.: US 10,963,652 B2
(45) Date of Patent: Mar. 30, 2021

(54) STRUCTURED TEXT TRANSLATION

(71) Applicant: salesforce.com, inc., San Francisco, CA (US)

(72) Inventors: Kazuma Hashimoto, San Francisco, CA (US); Raffaella Buschiazzo, San Francisco, CA (US); James Bradbury, Mountain View, CA (US); Teresa Marshall, San Francisco, CA (US); Caiming Xiong, Mountain View, CA (US); Richard Socher, Menlo Park, CA (US)

(73) Assignee: salesforce.com, inc., San Francisco, CA (US)

(*) Notice: Subject to any disclaimer, the term of this patent is extended or adjusted under 35 U.S.C. 154(b) by 163 days.

(21) Appl. No.: 16/264,392

(22) Filed: Jan. 31, 2019

(65) Prior Publication Data
US 2020/0184020 A1     Jun. 11, 2020

Related U.S. Application Data

(60) Provisional application No. 62/778,160, filed on Dec. 11, 2018.

(51) Int. Cl.
*G06F 40/58* (2020.01)
*G06N 3/08* (2006.01)

(52) U.S. Cl.
CPC ............... *G06F 40/58* (2020.01); *G06N 3/08* (2013.01)

(58) Field of Classification Search
CPC combination set(s) only.
See application file for complete search history.

(56) References Cited

U.S. PATENT DOCUMENTS

| 10,282,663 B2 | 5/2019 | Socher et al. |
| 10,346,721 B2 | 7/2019 | Albright et al. |
| 10,380,236 B1* | 8/2019 | Ganu ............... G06F 40/126 |
| 2016/0350653 A1 | 12/2016 | Socher et al. |
| 2017/0024645 A1 | 1/2017 | Socher et al. |

(Continued)

OTHER PUBLICATIONS

Voita et al. (Context-Aware Neural Machine Translation Learns Anaphora Resolution), Jul. 2018 https://www.aclweb.org/anthology/P18-1117/ (Year: 2018).*

(Continued)

*Primary Examiner* — Yogeshkumar Patel
(74) *Attorney, Agent, or Firm* — Haynes and Boone, LLP

(57) ABSTRACT

Approaches for the translation of structured text include an embedding module for encoding and embedding source text in a first language, an encoder for encoding output of the embedding module, a decoder for iteratively decoding output of the encoder based on generated tokens in translated text from previous iterations, a beam module for constraining output of the decoder with respect to possible embedded tags to include in the translated text for a current iteration using a beam search, and a layer for selecting a token to be included in the translated text for the current iteration. The translated text is in a second language different from the first language. In some embodiments, the approach further includes scoring and pointer modules for selecting the token based on the output of the beam module or copied from the source text or reference text from a training pair best matching the source text.

20 Claims, 10 Drawing Sheets

(56) References Cited

U.S. PATENT DOCUMENTS

| | | |
|---|---|---|
| 2017/0032280 A1 | 2/2017 | Socher |
| 2017/0140240 A1 | 5/2017 | Socher |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0300400 A1* | 10/2018 | Paulus .................... G06F 40/58 |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Kiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0188568 A1 | 6/2019 | Keskar et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258901 A1 | 8/2019 | Albright et al. |
| 2019/0258939 A1 | 8/2019 | Min et al. |
| 2019/0286073 A1 | 9/2019 | Asl et al. |
| 2019/0287012 A1* | 9/2019 | Celikyilmaz ........... G06F 40/56 |
| 2019/0295530 A1 | 9/2019 | Asl et al. |
| 2020/0034435 A1* | 1/2020 | Norouzi ............... G06N 3/0445 |
| 2020/0034436 A1* | 1/2020 | Chen ........................ G06F 40/58 |

OTHER PUBLICATIONS

Han et al. (Neural Machine Translation with Dynamic Selection Network), Dec. 7-10, 2018, IEEE https://ieeexplore.ieee.org/document/8781050?source=IQplus (Year: 2018).*

Nishimura et al. (Addressing unknown word problem for neural machine translation using distributee representations of words as input features), Aug. 16-18, 2017, IEEE https://ieeexplore.ieee.org/document/8090977?source=IQplus (Year: 2017).*

Aharoni et al., "Towards String-to-Tree Neural Machine Translation," Proceedings of the 55th Annual Meeting of the Association for Computational Linguistics. vol. 2, Short Paper. Vancouver, Canada. Jul. 30-Aug. 4, 2017. pp. 1-9.

Bawden et al., "Evaluating Discourse Phenomena in Neural Machine Translation," Proceedings of the 16th Annual Conference of the North American Chapter of the Association for Computational Linguistics: Human Language Technologies. New Orleans Louisiana. Jun. 1-6, 2018. pp. 1-10.

Bojar et al., "Proceedings of the Third Conference on Machine Translation: Shared Task Papers." Association for Computational Linguistics. WMT 2018. Brussels, Belgium. Oct. 31-Nov. 1, 2018. pp. 1-30.

Eriguchi et al., "Learning to Parse and Translate Improves Neural Machine Translation," Accepted as a short paper at the 55th Annual Meeting of the Association for Computational Linguistics, Vancouver, Canada. Jul. 30-Aug. 4, 2017. pp. 1-7.

Eriguchi et al., "Tree-to-Sequence Attentional Neural Machine Translation," Proceedings of the 54th Annual Meeting of the Association for Computational Linguistics. vol. 1: Long Papers. Berlin, Germany. Aug. 7-12, 2016. pp. 1-11.

Gu et al., "Search Engine Guided Neural Machine Translation," Thirty-Second Conference on the Association for the Advancement of Artificial Intelligence. New Orleans, Louisiana. Feb. 2-7, 2018. pp. 1-8.

Inan et al., "Tying Word Vectors and Word Classifiers: A Loss Framework for Language Modeling," International Conference on Learning Representation. Toulon, France. Apr. 24-26, 2017. pp. 1-13.

Johnson et al., "Google's Multilingual Neural Machine Translation System: Enabling Zero-Shot Translation," Transactions of the Association for Computational Linguistics. vol. 5. Oct. 1, 2017. pp. 1-14.

Kingma et al., "Adam: A Method for Stochastic Optimization," International Conference on Learning Representations. San Diego, California. May 7-9, 2015. pp. 1-15.

Koehn et al., "Moses: Open Source Toolkit for Statistical Machine Translation," Proceedings of the 45th Annual Meeting of the Association for Computational Linguistics 2007 Demo and Poster Sessions. Prague. pp. 1-4.

Kudo et al., "SentencePiece: A Simple and Language Independent Subword Tokenizer and Detokenizer for Neural Text Processing." Proceedings of the 2018 Conference on Empirical Methods in Natural Language Processing (System Demonstration). Brussels, Belgium. Oct. 31-Nov. 4, 2018. pp. 1-6.

Loshchilov et al., "Fixing Weight Decay Regularization in Adam," International Conference on Learning Representations. Toulon, France. Apr. 24-26, 2017. pp. 1-13.

Malaviya et al., "Sparse and Constrained Attention for Neural Machine Translation," Proceedings of the 56th Annual Meeting of the Association for Computational Linguistics. vol. 2. Austin, TX. Oct. 5-14, 2018. pp. 1-11.

McCann et al., "The Natural Language Decathlon: Multitask Learning as Question Answering," International Conference on Learning Representations. Vancouver, Canada. Apr. 30-May 3, 2018. pp. 1-23.

Michel et al., "MTNT: A Testbed for Machine Translation of Noisy Text," Proceedings of the Conference on Empirical Methods in Natural Language Processing. Brussels, Belgium. Nov. 2-4, 2018. pp. 1-11.

Miculicich et al., "Document-Level Neural Machine Translation with Hierarchical Attention Networks," Proceedings of the Conference on Empirical Methods in Natural Language Processing. Brussels, Belgium. Nov. 2-4, 2018. pp. 1-8.

Muller et al., "A Large-Scale Test Set for the Evaluation of Context-Aware Pronoun Translation in Neural Machine Translation," Proceedings of the Third Conference on Machine Translation: Research Papers. Stockholm, Sweden. Jul. 10-15, 2018. pp. 1-12.

Neubig et al., "Pointwise Prediction for Robust, Adaptable Japanese Morphological Analysis," Proceedings of 49th Annual Meeting of the Association for Computational Linguistics: Human Language Technologies. Portland, Oregon. Jun. 19-24, 2011. pp. 1-5.

Oda et al., "A Simple and Strong Baseline: NAIST-NICT Neural Machine Translation System for WAT2017 English-Japanese Translation Task," Proceedings of the 4th Workshop on Asian Translation. Taipei, Taiwan. Nov. 27-Dec. 1, 2017. pp. 1-11.

Oda et al., "Learning to Generate Pseudo-Code from Source Code Using Statistical Machine Translation." 30th IEEE/ACM International Conference on Automated Software Engineering. Lincoln, Nebraska. Nov. 9-13, 2015. pp. 1-11.

Papineni et al., "BLEU: a Method for Automatic Evaluation of Machine Translation," Proceedings of the 40th Annual Meeting of the Association for Computational Linguistics. Philadelphia. Jul. 11, 2002. pp. 1-8.

Parikh et al., "A Decomposable Attention Model for Natural Language Inference," Proceedings of the Conference on Empirical Methods in Natural Langauge Processing. Austin, Texas. Nov. 1-5, 2016. pp. 1-7.

Press et al., "Using the Output Embedding to Improve Language Models," Proceedings of the 15th Conference of the European Chapter of the Association for Computational Linguistics: vol. 2, Short Papers. Valencia, Spain. Apr. 3-7, 2017. pp. 1-7.

See et al., "Get to the Point: Summarization with Pointer-Generator Networks," in Proceedings of the 55th Annual Meeting of the

(56) References Cited

OTHER PUBLICATIONS

Association for Computational Linguistics, vol. 1: Long Papers. Vancouver, Canada. Jul. 30-Aug. 4, 2017. pp. 1-20.

Silvestre et al., "Translation Memory Systems Have a Long Way to Go." Proceedings of the Workshop Human-Informed Translation and Interpreting Technology. Association for Computational Linguistics. Vancouver, Canada. Jul. 30-Aug. 4, 2017. pp. 1-8.

Varga et al., "Parallel Corpora for Medium Density Languages." Proceedings of the International Conference on Recent Advances in Natural Language Processing. Borovets, Bulgaria. Sep. 21-23, 2005. pp. 1-7.

Vaswani et al., "Attention is All You Need," 31st Conference on Neural Information Processing Systems. Long Beach, CA. Dec. 4-9, 2017. pp. 1-15.

Zhang et al., "Improving the Transformer Translation Model with Document-Level Context." Conference on Empirical Methods in Natural Language Processing. Brussels, Belgium. Oct. 31-Nov. 4, 2018. pp. 1-10.

U.S. Appl. No. 16/006,691.

Anonymous: "Beam search—Wikipedia," Retrieved from the Internet: URL:https://en.wikipedia.org/w/index.php?title=Beam search &oldid=869962000, retrieved on Oct. 21, 2020, pp. 1-3.

Hashimoto et al., "A High-Quality Multilingual Dataset for Structured Documentation Translation," Proceedings of the Fourth Conference on Machine Translation, vol. 1: Research Papers, pp. 116-127, Florence, Italy, Aug. 1-2, 2019.

International Search Report and Written Opinion from PCT/US2019/064317, dated Apr. 2, 2020, pp. 1-10.

\* cited by examiner

- Example (a)
<u>English:</u>
You can use this report on your Community Management Home dashboard or in <ph>Community Workspaces</ph> under <menucascade><uicontrol>Dashboards</uicontrol><uicontrol>Home</uicontrol></menucascade>.
<u>Japanese:</u>
このレポートは、[コミュニティ管理]のホームのダッシュボード、または<ph>コミュニティワークスペース</ph>の<menucascade><uicontrol>[ダッシュボード]</uicontrol><uicontrol>[ホーム]</uicontrol></menucascade>で使用できます。

- Example (b)
<u>English:</u>
Results with <b>both</b><i>beach</i> and <i>house</i> in the searchable fields of the record.
<u>Japanese:</u>
レコードの検索可能な項目に <i>beach</i> と <i>house</i> の <b>両方</b>が含まれている結果。

- Example (c)
<u>English:</u>
You can only predefine this field to an email address. You can predefine it using either T (used to define email addresses) or To Recipients (used to define contact, lead, and user IDs).
<u>Japanese:</u>
この項目はメールアドレスに対してのみ事前に定義できます。
この項目は [宛先] (メールアドレスを定義するために使用) または [宛先受信者] (取引先責任者、リード、ユーザ ID を定義するために使用) のいずれかを使用して事前に定義できます。

*FIG. 2A*

This is an <xref>international conference</xref> called <b>NAACL</b>.
これは<b>NAACL</b>という<xref>国際会議</xref>です。 international conference
国際会議

-HLT is usually appended.
-HLT がつけられることが多い。

<p>This is an <xref>international conference</xref> called <b>NAACL</b>. <note>-HLT is usually appended.</note></p>  En <p>これは <b>NAACL</b> という <xref>国際会議</xref>です。 <note>-HLT がつけられることが多い。</note></p>  Ja

*FIG. 2B*

|       | BLEU  | NE&NUM Precision, Recall | BLEU  | NE&NUM Precision, Recall | BLEU  | NE&NUM Precision, Recall | BLEU  | NE&NUM Precision, Recall |
|-------|-------|--------------------------|-------|--------------------------|-------|--------------------------|-------|--------------------------|
|       | English-to-Japanese | | English-to-Chinese | | English-to-French | | English-to-German | |
| OT    | 61.61 | 89.84, 89.84 | 58.06 | 94.91, 93.62 | 64.07 | 88.84, 85.64 | 50.51 | 88.40, 86.55 |
| X     | 62.00 | 92.54, 90.51 | 58.61 | 94.56, 93.44 | 63.98 | 87.48, 86.98 | 50.96 | 88.79, 86.43 |
| $X_{ts}$ | 64.25 | 91.64, 90.98 | 60.05 | 94.44, 94.27 | 63.51 | 88.42, 85.64 | 52.91 | 88.00, 86.78 |
| $X_{ts}^{(T)}$ | 64.34 | 93.39, 91.75 | 59.86 | 93.49, 93.11 | 65.04 | 88.98, 88.31 | 52.69 | 88.22, 88.45 |
|       | English-to-Finnish | | English-to-Dutch | | English-to-Russian | | Finnish-to-Japanese | |
| OT    | 43.97 | 87.55, 84.99 | 59.54 | 90.89, 88.59 | 43.28 | 89.67, 85.26 | 54.35 | 90.45, 89.69 |
| X     | 42.84 | 83.17, 85.55 | 60.18 | 90.41, 90.26 | 43.44 | 87.96, 88.35 | 54.69 | 93.47, 89.29 |
| $X_{ts}$ | 45.10 | 86.41, 86.49 | 60.58 | 88.76, 90.11 | 46.73 | 88.65, 89.55 | 57.92 | 93.02, 89.03 |
| $X_{ts}^{(T)}$ | 45.71 | 87.38, 88.91 | 61.01 | 87.66, 90.84 | 46.44 | 86.90, 89.59 | 57.06 | 93.39, 89.38 |

FIG. 11A

|       | BLEU  | XML Acc., Match | BLEU  | XML Acc., Match | BLEU  | XML Acc., Match | BLEU  | XML Acc., Match |
|-------|-------|-----------------|-------|-----------------|-------|-----------------|-------|-----------------|
|       | English-to-Japanese | | English-to-Chinese | | English-to-French | | English-to-German | |
| X     | 59.77 | 99.80, 99.55 | 57.01 | 99.95, 99.70 | 61.81 | 99.60, 99.30 | 48.91 | 99.85, 99.25 |
| $X_{ts}$ | 62.06 | 99.80, 99.40 | 58.43 | 99.90, 99.60 | 61.87 | 99.80, 99.50 | 51.16 | 99.75, 99.30 |
| $X_{ts}^{(T)}$ | 62.27 | 99.95, 99.60 | 57.92 | 99.75, 99.40 | 63.19 | 99.80, 99.35 | 50.47 | 99.80, 99.20 |
|       | English-to-Finnish | | English-to-Dutch | | English-to-Russian | | Finnish-to-Japanese | |
| X     | 41.98 | 99.65, 99.25 | 57.86 | 99.60, 99.25 | 40.72 | 99.60, 98.95 | 52.14 | 99.90, 99.30 |
| $X_{ts}$ | 43.57 | 99.50, 99.25 | 58.51 | 99.70, 99.30 | 44.42 | 99.75, 99.25 | 55.20 | 99.65, 98.90 |
| $X_{ts}^{(T)}$ | 44.22 | 99.90, 99.65 | 60.19 | 99.90, 99.85 | 44.25 | 99.80, 99.35 | 54.05 | 99.60, 98.75 |

FIG. 11B

| Training data | Our dev set | newstest2014 |
|---|---|---|
| Our dataset (no XML) | 64.07 | 7.35 |
| w/ 10K news | 63.66 | 14.02 |
| w/ 20K news | 64.31 | 16.30 |
| Only 10K news | 0.90 | 2.66 |
| Only 20K news | 2.35 | 6.72 |

FIG. 11C

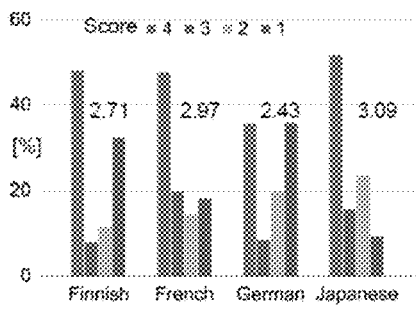

FIG. 11D

|             | Finnish | French | German | Japanese |
|-------------|---------|--------|--------|----------|
| Accuracy    | 30.0    | 32.8   | 37.4   | 37.4     |
| Readability | 20.6    | 20.4   | 0.8    | 17.4     |
| Formatting  | 10.6    | 0.0    | 0.8    | 1.0      |
| Grammar     | 20.2    | 10.0   | 11.4   | 5.8      |
| Structure   | 10.2    | 2.8    | 2.0    | 1.2      |
| Terminology | 12.0    | 3.0    | 2.4    | 0.6      |

FIG. 11E

STRUCTURED TEXT TRANSLATION

RELATED APPLICATIONS

The present application claims priority to U.S. Provisional Patent Application No. 62/778,160, filed Dec. 11, 2018, entitled "Structured Text Translation," which is hereby incorporated by reference in its entirety.

TECHNICAL FIELD

The present disclosure relates generally to natural language processing and more specifically to translating structured text with embedded tags.

BACKGROUND

Natural language processing and the ability of a system to translate natural language that is in a structured form that includes embedded tags (e.g., XML, HTML, and/or the like) is an important machine translation task. This can be a complex task because it includes not only translating the text, but it also includes appropriately handling the embedded tags.

Accordingly, it would be advantageous to have systems and methods for translating structured text.

BRIEF DESCRIPTION OF THE DRAWINGS

FIGS. 2A and 2B are simplified diagrams of structured translated text according to some embodiments.

FIGS. 11A-11E are simplified diagrams of the results of structured text translation according to some embodiments.

In the figures, elements having the same designations have the same or similar functions.

DETAILED DESCRIPTION

Machine translation is an important task in the field of Natural Language Processing (NLP). Most approaches to machine translation focus on translating plain text. However, text data on the Web and in databases is not always stored as plain text, but usually wrapped with markup languages to incorporate document structures and metadata. Structured text in this form provides added challenges to the translation process, while also providing helpful clues that can aid in the translation process.

Figure 1:
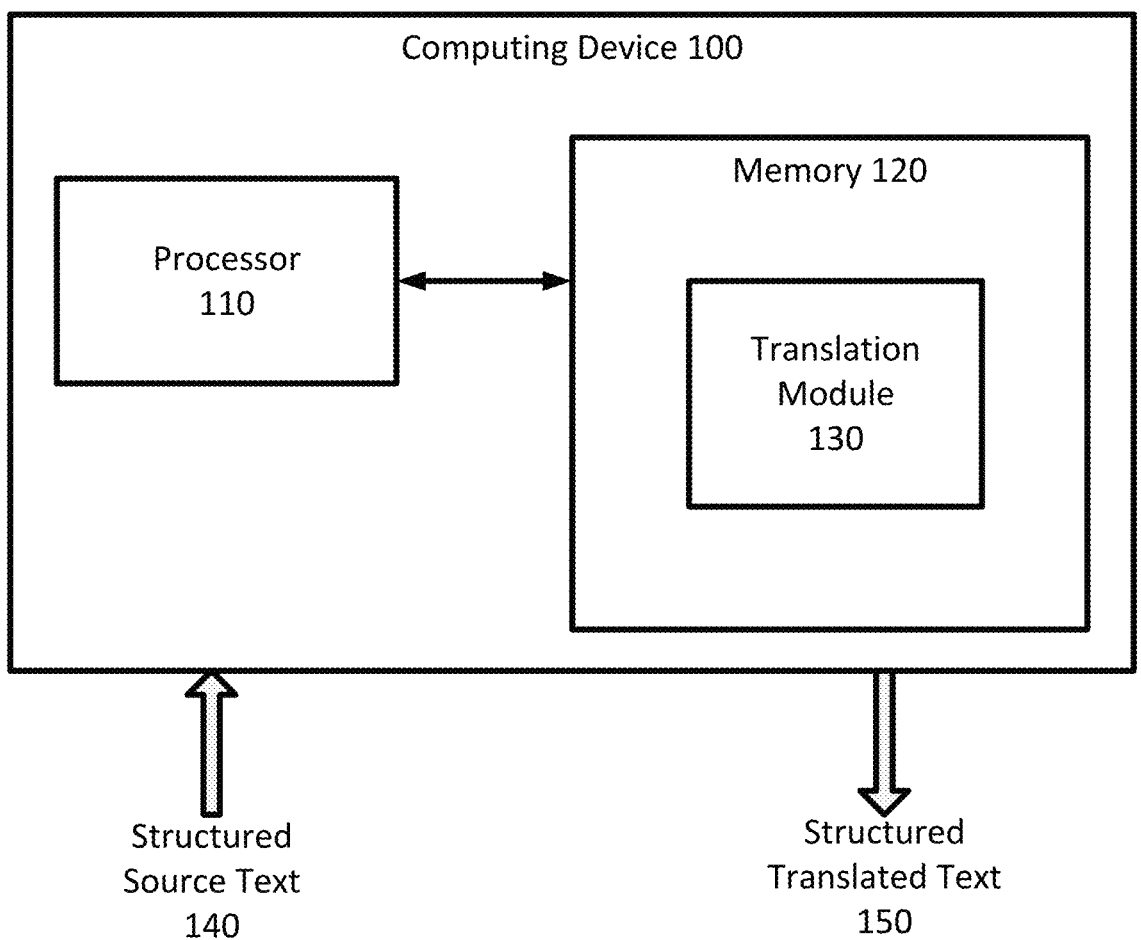
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a translation module 130 that may be used to implement and/or emulate the translation systems and models described further herein and/or to implement any of the methods described further herein. In some examples, translation module 130 may be used to translate structured text. In some examples, translation module 130 may also handle the iterative training and/or evaluation of a translation system or model used to translate the structured text. In some examples, memory 120 may include non-transitory, tangible, machine readable media that includes executable code that when run by one or more processors (e.g., processor 110) may cause the one or more processors to perform the counting methods described in further detail herein. In some examples, translation module 130 may be implemented using hardware, software, and/or a combination of hardware and software. As shown, computing device 100 receives structured source text 140, which is provided to translation module 130, translation module 130 then generates structured translated text 150.

FIGS. 2A and 2B are simplified diagrams of structured translated text according to some embodiments. FIGS. 2A and 2B show various examples of structured English text and corresponding structured Japanese text. Depending upon whether translation module 130 is being used to translate structured English to structured Japanese or structured Japanese to structured English, either the structured English or the structured Japanese may correspond to structured source text 140 or structured translated text 150.

Figure 3:
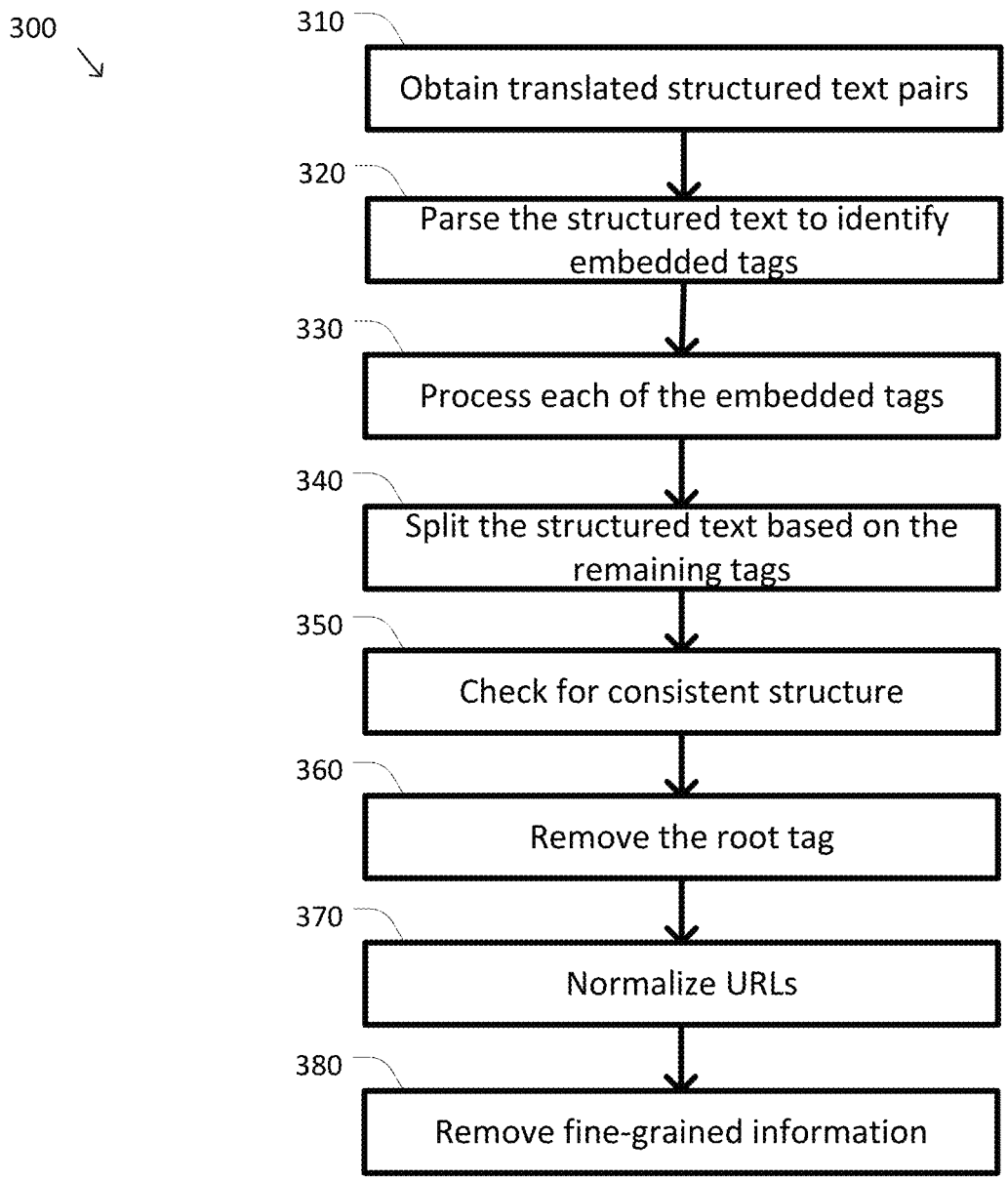
FIG. 3 is a simplified diagram of a method of preparing structured text training data according to some embodiments.

FIG. 3 is a simplified diagram of a method 300 of preparing structured text training data according to some embodiments. One or more of the processes 310-380 of method 300 may be implemented, at least in part, in the form of executable code stored on non-transitory, tangible, machine-readable media that when run by one or more processors may cause the one or more processors to perform one or more of the processes 310-380. In some embodiments, method 300 may be used to prepare structured text training data, such as the training data used to train translation module 130. In some embodiments, one or more of processes 370 and/or 380 is optional and may be omitted. In some embodiments, one or more of processes 360, 370, and/or 380 may be performed before process 350.

At a process 310, translated structured text pairs are obtained. Each of the structured text pairs correspond to the same structured text in two different languages (e.g., English, Brazilian Portuguese, Danish, Dutch, Finnish, French, German, Italian, Japanese, Korean, Mexican Spanish, Norwegian, Russian, Simplified Chinese, Spanish, Swedish, and Traditional Chinese, and/or the like). In some examples, each of the structured text pairs was initially translated by a human professional. In some examples, each of the structured text pairs may be obtained from an online help repository. In some examples, the structured text pairs may be obtained by crawling the online help repository using different language identifiers. In some tags, each structured text example in the structured text pair may include structured text elements from a markup language, such as XML, HTML, and/or the like.

At a process 320, the structured text from both parts of the pair are parsed to identify embedded tags. The structured text is parsed to identify each of the tags embedded in the text, such as by identifying string patterns such as "<opentag>", </closetag>, and/or the like. In the examples, of FIG. 2A, the embedded tags include <ph>, </ph>, <menucascade>, <uicontrol>, </uicontrol>, and </menucascade>. In some examples, a software utility, such as the etree module of the Python library lxml may be used to process the structured text to identify the tags.

At a process 330, each of the embedded tags is processed. In some examples, each of the embedded tags is parsed according to its type. In some examples, the possible types are "translatable", "transparent", and "untranslatable". Each of the translatable tags corresponds to a tag that includes translatable text between an opening tag and its corresponding closing tag. In some examples, translatable tags may have other tags, including other translatable tags embedded nested between the opening tag and the corresponding closing tag. In some examples, the translatable tags include title, p, li, shortdesc, indexterm, note, section, entry, dt, dd, fn, cmd, xref, info, stepresult, stepxmp, example, context, term, choice, stentry, result, navtitle, linktext, postreq, prereq, cite, chentry, sli, choption, chdesc, choptionhd, chdeschd, sectiondiv, pd, pt, stepsection, index-see, conbody, fig, body, ul, and/or the like. Each of the transparent tags corresponds to tags that do not always align well between different languages due to differences in grammar structures and/or like. Each of the transparent tags is retained in the structured text and is not considered further during method 300. In some examples, the transparent tags include ph, uicontrol, b, parmname, i, u, menucascade, image, userinput, codeph, systemoutput, filepath, varname, apiname, and/or the like. Each of the untranslatable tags is removed from the structured text. In some examples, the untranslatable tags include sup, codeblock, and/or the like.

At a process 340, the structured text is split based on the remaining tags. In some examples, the corresponding translatable tags from both parts are matched up and aligned to identify one or more portions of the structured text that is included in both parts of the pair and that corresponds to the same translated content and which may be split into separate training data pairs. Each of the one or more portions including an opening embedded tag, a corresponding closing embedded tag, and the structured text between the opening embedded tag and the corresponding closing embedded tag. In some examples, a nested translatable tag that has trailing text may be left embedded within the translatable tag in which it is nested (e.g., to avoid leaving part of a sentence out of one or more of the parts of the pair), split out into its own training pair, and/or used for both purposes. In the examples of FIG. 2B, the translatable tags include <p>, <xref>, and <note> and each is extracted for use to generate a training data pair. The examples of FIG. 2B also show that the <xref> tag is left embedded in the training data pair based on the <p> tag because of the trailing text "called . . . " in the structured text. In some examples, each of the training data pairs may include a sentence fragment, a single sentence, and/or multiple sentences.

At a process 350, the training data pairs are checked for consistent structure. In some examples, the two parts of the training data pair are checked to see if they each include a same set of tags with a consistent nesting. In some examples, this check helps ensure that better training data pairs are obtained. In some examples, when the structure of the structured text in the training data pair does not match, that training data pair is discarded.

At an optional process 360, the root tag is removed. In the examples of FIG. 2B, the <p>, <xref>, and <note> tags and their corresponding closing tags are removed from the respective examples. However, in the case of the <p> tag training data pair, the <xref> tag is left embedded as it is not the root tag of that training data pair.

At an optional process 370, uniform resource locators (URLs) in the structured text are normalized. In some examples, the URLs are normalized to avoid inconsistencies in resource naming that are common between different translations (e.g., each language may include different URLs for figures, links to other pages, and/or the like that include language designators, and/or the like). In some examples, the URLs are normalized by creating matching placeholders (e.g., "#URL1 #") to provide consistency between the parts of the training data pair.

At an optional process 380, fine-grained information is removed. In some examples, the fine-grained information may correspond to attributes of a tag (e.g., a color, a pixel size, and/or the like), which are often related more to visual characteristics than translatable natural language elements.

Once method 300 is used to process a structured text pair, one or more training data pairs are generated and stored in a training data repository associated with the languages of the parts of the one or more training data pairs. In some examples, because the language translation is correct for both directions within the training data pair, either part of the training data pair may be used as the structured source text (e.g., structured source text 140) and/or correspond to the ground truth for the structured translated text (e.g., structured translated text 150) when the other part of the training data pair is used as the structured source text.

Figure 4:
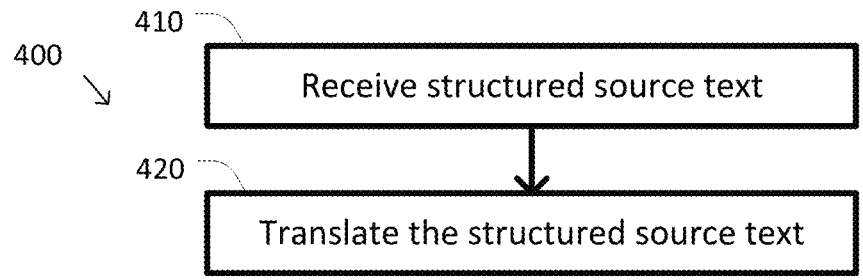
FIG. 4 is a simplified diagram of a method of structured text translation according to some embodiments.

FIG. 4 is a simplified diagram of a method 400 of structured text translation according to some embodiments. One or more of the processes 410-420 of method 400 may be implemented, at least in part, in the form of executable code stored on non-transitory, tangible, machine-readable media that when run by one or more processors may cause the one or more processors to perform one or more of the processes 410-420. In some embodiments, method 400 may correspond to the method used by a translation module, such as translation module 130, to translate structured text. In some examples, the translation module may be trained according to a desired source language and a desired translated language (e.g., English to French, and/or the like). In some examples, the translation module may be trained using training data pairs generated by method 300.

At a process 410, structured source text is received. In some examples, the structured source text may include text in a markup language (such as XML, HTML, and/or the like) that contains one or more embedded tags. In some examples, the text body of the structured source text may be in the source language. In some examples, the structured source text may correspond to structured source text 140. In some examples, the structured source text may be received from a web crawler, a document, a database, and/or the like.

At a process 420, the structured source text is translated. The structured source text received during process 410 is provided to the translation module, which translates the structured source text to structured translated text in the desired translated language. In some examples, the translation module performs the translation using an attention-based transformer approach as is described in further detail below with respect to FIGS. 5-9. In some examples, the structured source text is translated based on the embedded tags. In some examples, the translation may be performed using a constrained beam search. In some examples, the constraints on the beam search keep track of the embedded tags in the structured source text and limit the embedded tags in the structured translated text to those that are possible, keep track of the open embedded tags so that they can be closed in the structured translated text, and/or prevent generation of an end of stream (EOS) embedded tag before the other embedded tags are resolved (e.g., included and/or closed). In some examples, the source text may be translated using an attention-based structure In some examples, the selection of an output token/word in the structured translated text may be selected using a modified pointer approach that includes additional mechanisms to support the copying of text from the structured source text to the structured translated text, copying text from a training data sample when the source text corresponds to similar textual segments from the training data, and/or the like.

Figure 5:
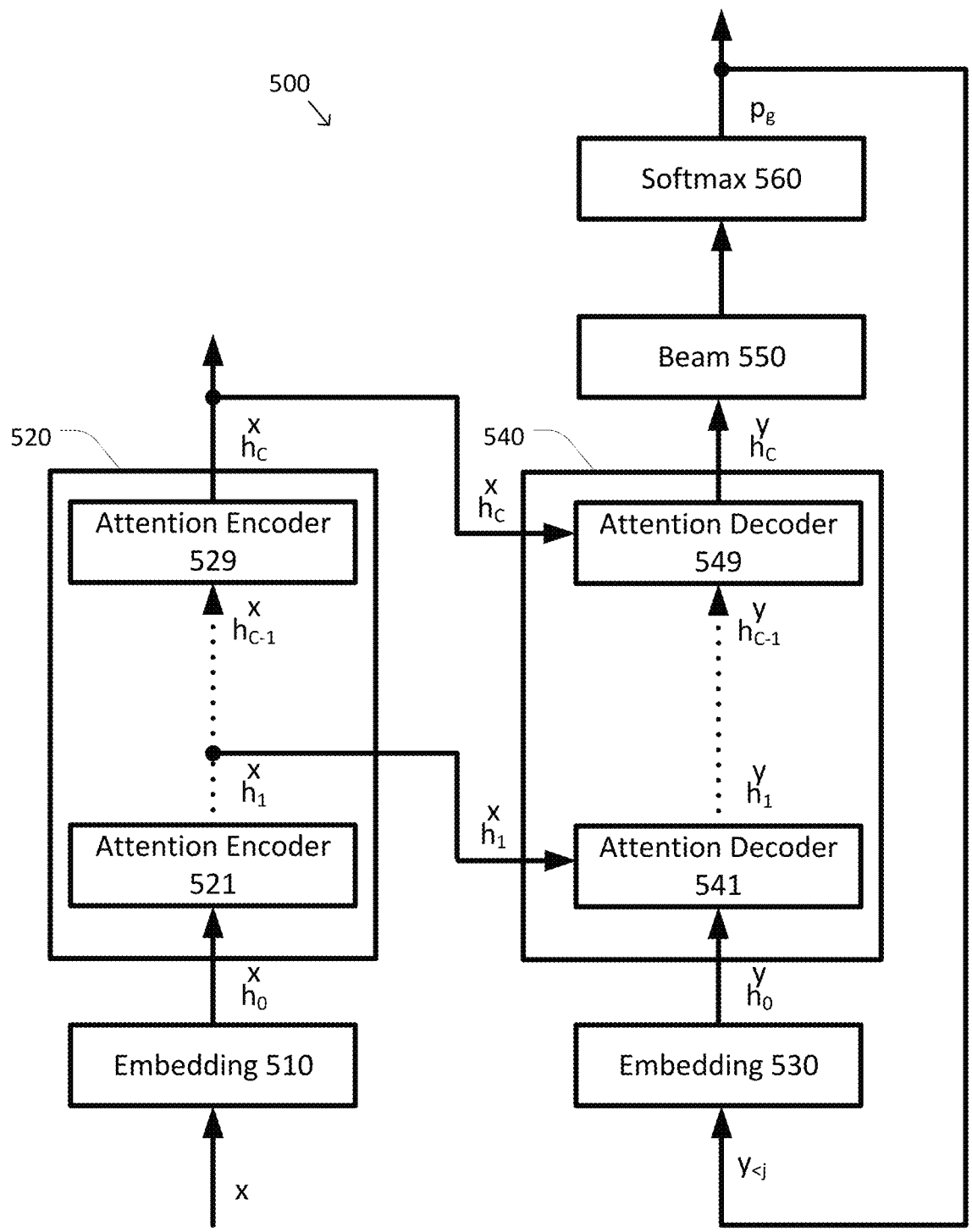
FIG. 5 is a simplified diagram of a structured text translator according to some embodiments.

FIG. 5 is a simplified diagram of a structured text translator 500 according to some embodiments. In some embodiments, structured text translator 500 may be consistent with translation module 130 and/or the translation module of method 400. In some examples, structured text translator 500 is a multi-layer neural network. As shown in FIG. 5, structured text translator 500 receives structured source text x, such as the structured source text 140 and/or the structured source text received during process 410. The structured source text x is passed to an embedding module 510, which breaks the structured source text into tokens $x_i$, where each of the tokens $x_i$ may correspond to a word, a number, a tag, and/or the like. In some examples, embedding module 510 embeds each token using a combination of a token embedding $v(x_i) \in \mathbb{R}^d$ and a positional embedding $e(i) \in \mathbb{R}^d$ according to Equation 1 where $\mathbb{R}$ is the set of real numbers and d is a dimension of the embedding and encoding. In some examples, d may be empirically selected based on experimental performance of the structured text translator 500 and/or embedding module 510. In some examples, d may be 256.

$$h_0^x(x_i) = \sqrt{d} v(x_i) + e(i) \qquad \text{Equation 1}$$

The embeddings of each of the tokens $x_i$ are then combined in a vector as $h_0^x = [h_0^x(x_1), h_0^x(x_2), \ldots, h_0^x(x_N)]$ where N is the number of tokens in the structured source data.

The output, N of embedding module 510 is then passed to a multi-stage encoder 520 of a multi-layer attention-based transformer. Multi-stage encoder 520 includes a sequence of C attention encoders 521-529. In some examples, C may be 1, 2, 3, 4, 5, 6, or more. Each of the attention encoders 521-529 encodes an output of a previous attention encoder in the sequence, with the exception of attention encoder 521, which receives the output of embedding module 510 so that the cth attention encoder 521-529 in the sequence generates its output according to Equation 2 and as described in further detail below.

$$h_c^x(x_i) = f(i, h_{c-1}^x) \in \mathbb{R}^d \qquad \text{Equation 2}$$

The output $h_C^x$ of the last attention encoder 529 in multi-stage encoder 520 is then passed to a multi-stage decoder 540 of the multi-layer attention-based transformer. Multi-stage decoder 540 includes a sequence of C attention decoders 541-549. Each of the attention decoders 541-549 decodes an output of a previous attention decoder in the sequence, with the exception of attention decoder 541, which receives the output of an embedding module 530 so that the cth attention decoder 541-549 in the sequence generates its output according to Equation 3 and as described in further detail below.

$$h_c^y(y_j) = g(j, h_c^x, h_{c-1}^y) \in \mathbb{R}^d \qquad \text{Equation 3}$$

Embedding module 530 embeds each token from an iteratively generated structured translated text y, where $y_{<j}$ corresponds to the generated tokens $y_0$ through from each of the iterations before the current jth iteration, where $y_0$ corresponds to a beginning of sequence (BOS) token. In some examples, embedding module 530 is similar to embedding module 510 and uses a combination of the token embedding $v(y_j)$ and the positional embedding $e(j)$ according to Equation 4.

$$h_0^y(y_j) = \sqrt{d} v(y_j) + e(j) \qquad \text{Equation 4}$$

The embeddings of each of the tokens $y_j$ are then combined in a vector as $h_0^y = [h_0^y(y_1), h_0^y(y_2), \ldots, h_0^y(y_{j-1})]$.

Attention decoders, attention encoders, and multi-layer attention-based transformers are built around attention networks. Attention decoders, attention encoders, and multi-layer attention-based transformers as well as the functions f and g are are described in greater detail below as well as in Vaswani, et al. "Attention is All You Need," Advances in Neural Information Processing Systems 40, pages 5998-6008, which is incorporated by reference.

Figure 6:
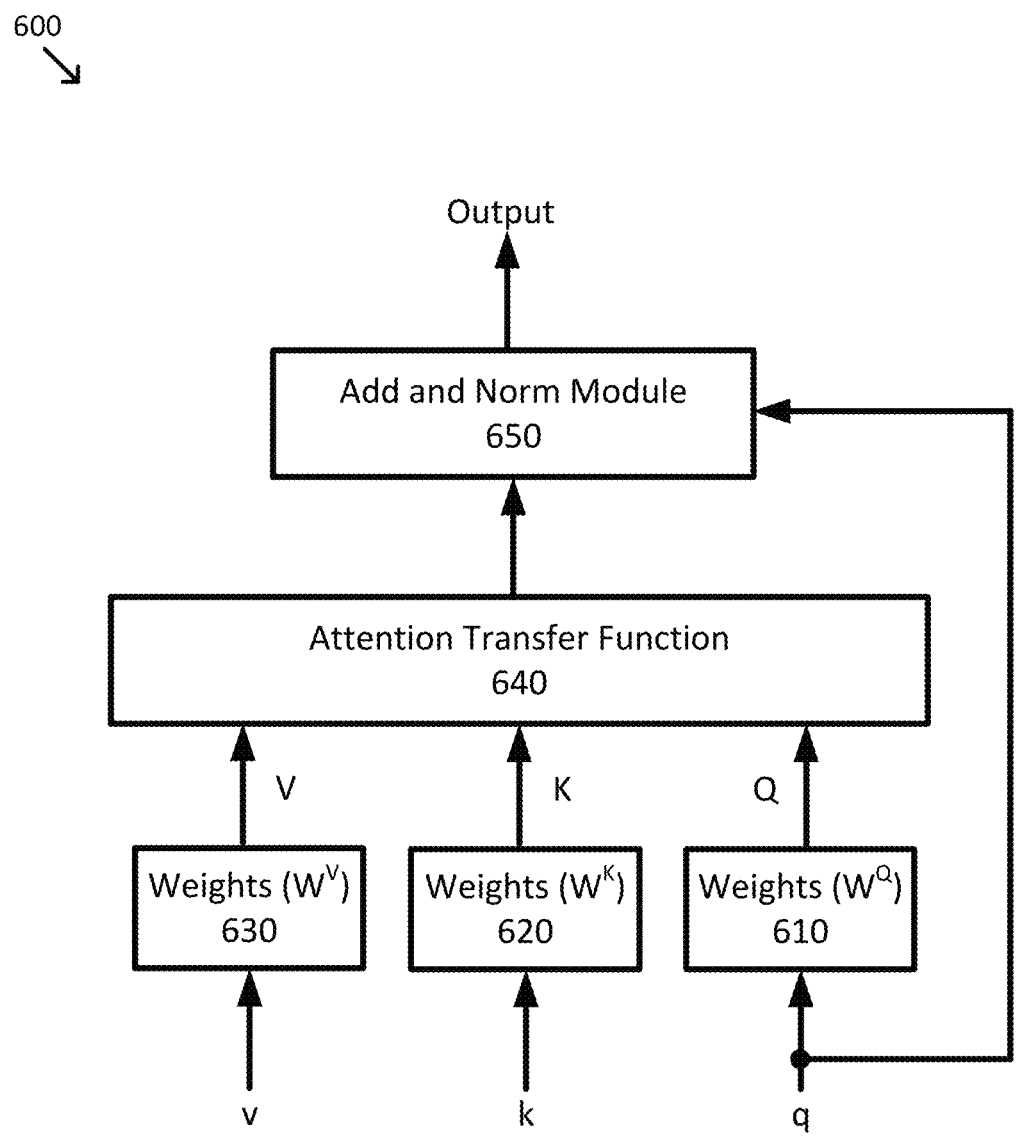
FIG. 6 is a simplified diagram of an attention network according to some embodiments.

FIG. 6 is a simplified diagram of an attention network 600 according to some embodiments. In some examples, attention network 600 is a multi-layer neural network As shown in FIG. 6, attention network 600 receives a query $q \in \mathbb{R}^{d_q}$, a key $k \in \mathbb{R}^{d_q}$, and a value $v \in \mathbb{R}^{d_v}$. Each of the q, k, and v are subject to respective weights $W^Q$ 610, $W^K$ 620, and $W^V$ 630 according to Equation 5. The weights $W^Q$ 610, $W^K$ 620, and $W^V$ 630 are altered during training using back propagation.

$$Q = qW^Q \in \mathbb{R}^{d_q}$$
$$K = kW^K \in \mathbb{R}^{d_k}$$
$$V = vW^V \in \mathbb{R}^{d_v} \qquad \text{Equation 5}$$

The resulting Q, K, and V vectors are passed through an attention transfer function 640, which generates a dot product of Q and K, which is then applied to V according to Equation 6.

$$\text{Attention}(Q, K, V) \text{softmax}\left(\frac{QK^T}{\sqrt{d_k}}\right) V \in \mathbb{R}^{d_v} \qquad \text{Equation 6}$$

An addition and normalization module 650 is then used to combine the query q with the output from the attention transfer function to provide a residual connection that improves the rate of learning by attention network 600. Addition and normalization module 650 implements Equation 7 where μ and σ are the mean and standard deviation, respectively, of the input vector and $g_i$ is gain parameter for scaling the layer normalization. The output from addition and normalization module 650 is the output of attention network 600.

$$\text{LayerNorm}(\text{Attention}(Q, K, V) + q) \qquad \text{Equation 7}$$
$$\text{LayerNorm}(a_i) = g_i \frac{a_i - \mu}{\sigma}$$

Attention network 600 is often used in two variant forms. The first variant form is a multi-head attention network where multiple attention networks consistent with attention network 600 are implemented in parallel, which each of the "heads" in the multi-head attention network having its own weights $W^Q$ 610, $W^K$ 620, and $W^V$ 630, which are initialized to different values and thus trained to learn different encodings. The outputs from each of the heads are then concatenated together to form the output of the multi-head attention network. The second variant form is a self-attention network that is a multi-head attention network where the q, k, and v inputs are the same for each head of the attention network.

Figure 7:
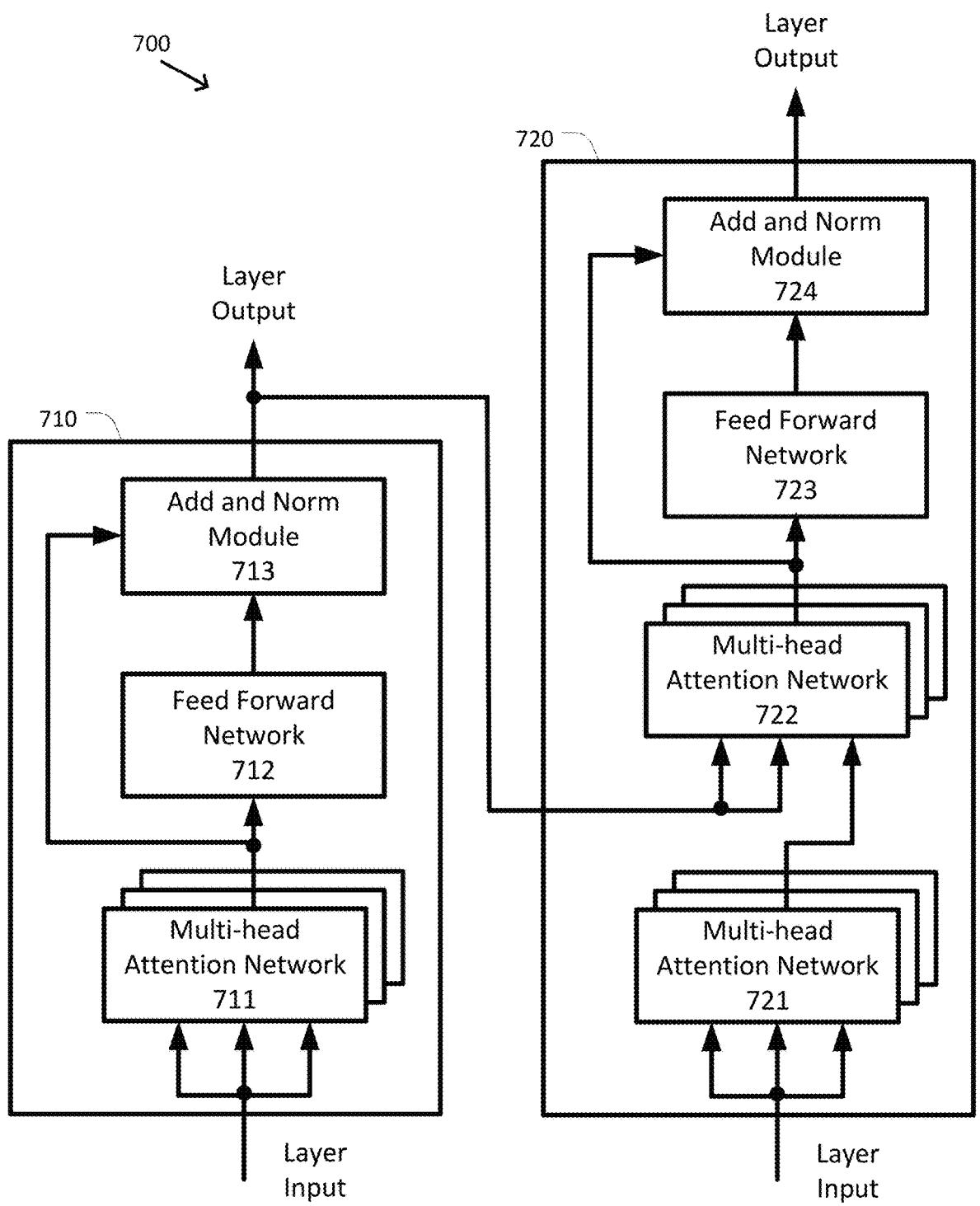
FIG. 7 is a simplified diagram of a layer for an attention-based transformer network according to some embodiments.

FIG. 7 is a simplified diagram of a layer 700 for an attention-based transformer network according to some embodiments. In some embodiments, layer 700 corresponds to each of the layers in the multi-layer attention-based transformer of FIG. 5. In some examples, layer 700 is a multi-layer neural network As shown in FIG. 7, layer 700 includes an encoder 710 and a decoder 720. In some embodiments, encoder 710 is consistent with any of attention encoders 521-529 and decoder 720 is consistent with any of attention decoders 541-549.

Encoder 710 receives layer input (e.g., from an input network for a first layer in an encoding stack, such as embedding module 510, or from layer output of a next lowest layer, such as any of the attention encoders 521-529 except for attention encoder 529, for all other layers of the encoding stack) and provides it to all three (q, k, and v) inputs of a multi-head attention network 711, thus multi-head attention network 711 is configured as a self-attention network. Each head of multi-head attention network 711 is consistent with attention network 600. In some examples, multi-head attention network 711 includes three heads, however, other numbers of heads such as two or more than three are possible. In some examples, each attention network has a dimension equal to a hidden state size of the attention network divided by the number of heads. In some examples, the hidden state size is 256. The output of multi-head attention network 711 is provided to a feed forward network 712 with both the input and output of feed forward network 712 being provided to an addition and normalization module 713, which generates the layer output for encoder 710. In some examples, feed forward network 712 is a two-layer perceptron network with a rectified linear unit (ReLU) activation, which implements Equation 8 where γ is the input to feed forward network 712 and $M_i$ and $b_i$ are the weights and biases respectively of each of the layers in the perceptron network. In some examples, addition and normalization module 713 is substantially similar to addition and normalization module 650.

$$FF(\gamma) = \max(0, \gamma M_1 + b_1) M_2 + b_2 \qquad \text{Equation 8}$$

Decoder 720 receives layer input (e.g., from an input network for a first layer in a decoding stack, such as embedding module 530, or from layer output of a next lowest layer, such as any of the attention decoders 541-549 except for attention decoder 549, for all other layers of the decoding stack) and provides it to all three (q, k, and v) inputs of a multi-head attention network 721, thus multi-head attention network 721 is configured as a self-attention network. Each head of multi-head attention network 721 is consistent with attention network 600. In some examples, multi-head attention network 721 includes three heads, however, other numbers of heads such as two or more than three are possible. The output of encoder 710 is provided as the q input to another multi-head attention network 722 and the k and v inputs of multi-head attention network 722 are provided with the output from the encoder. Each head of multi-head attention network 721 is consistent with attention network 600. In some examples, multi-head attention network 722 includes three heads, however, other numbers of heads such as two or more than three are possible. In some examples, each attention network has a dimension equal to a hidden state size of the attention network divided by the number of heads. In some examples, the hidden state size is 256. The output of multi-head attention network 722 is provided to a feed forward network 723 with both the input and output of feed forward network 723 being provided to an addition and normalization module 724, which generates the layer output for encoder 710. In some examples, feed forward network 723 and addition and normalization module 724 are substantially similar to feed forward network 712 and addition and normalization module 713, respectively.

Referring back to FIG. 5, in addition to the multi-layer attention-based transformer, structured text translator 500 further includes a beam module 550 for processing the output of decoder 540. Beam module 550 performs a constrained beam search that helps ensure that when structured text translator 500 recommends a next token w for inclusion in the output sequence that is an embedded tag that the embedded tag is consistent with the structure of the structured translated text $y_{<j}$ translated from previous iterations as well is consistent with the structure of the structured source text x. In some embodiments, beam module 550 enforces several constraints. In some examples, the constraints include a constraint that limits opening embedded tags to only the embedded tags included in the structure source text x. In some examples, the constraints include a constraint that limit a closing embedded tag to only the last opened embedded tag. In some examples, the constraints include a constraint that only allows an end of sequence (EOS) tag to be generated when each of the tags in the structured source text x have corresponding opening and closing embedded tags in the structured translated text $y_{<j}$ translated from previous iterations.

Figure 8:
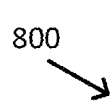
FIG. 8 is a simplified diagram of an algorithm for constraining a beam search for structured text according to some embodiments.

FIG. 8 is a simplified diagram of an algorithm 800 for constraining a beam search for structured text according to some embodiments. In some examples, algorithm 800 may be performed by beam module 550.

Referring back to FIG. 5, the output of beam module 550, which includes the output of multi-stage decoder 540 as constrained by beam module 550, are passed to a softmax layer 560. Softmax layer 560 predicts that next token w to be included in the structured translated text y at the end of the current iteration according to Equation 9, where softmax is the softmax function, $W \in \mathbb{R}^{|V| \times d}$ is a weight matrix, $b \in \mathbb{R}^{|V|}$ is a bias vector, V is the vocabulary of possible tokens, and d is the dimension of the token and positional embeddings.

$$p_g(w|x,y_{<j}) = \text{softmax}(Wh_k^y(y_j)+b) \qquad \text{Equation 9}$$

In some embodiments, structured text translator 500 may be trained using any suitable training function, such as stochastic gradient descent. In some examples, the training data used to train structure text translator 500 may be generated using method 300. In some examples, the loss function L for the training may be consistent with Equation 10, where M is the number of tokens in the structured translated text y.

$$L(x,y) = \Sigma_{j=1}^{M-1} \log p_g(w=y_{j+1}|x,y_{<j}) \qquad \text{Equation 10}$$

According to some embodiments, the translation of structured source text by a structured text translator, such as structured text translator 500, may be improved by allowing the structured text translator to copy tokens and text from the structured source text and/or retrieved from structured reference text from one of the pairs of structured source text and structured translated text from the training data used to train the structured text translator. In some embodiments, a modified pointer approach may be used to determine when the next token for the structured translated text should be generated using $p_g$ from structured text translator 500 or similar, copied from the structured source text, or retrieved from a training pair. General pointer approaches are described in more detail in McCann, et al., "The Natural Language Decathlon: Multitask Learning as Question Answering," arXiv preprint arXiv:1806.08730 and co-owned U.S. patent application Ser. No. 15/131,970, both of which are incorporated by reference herein.

Figure 9:
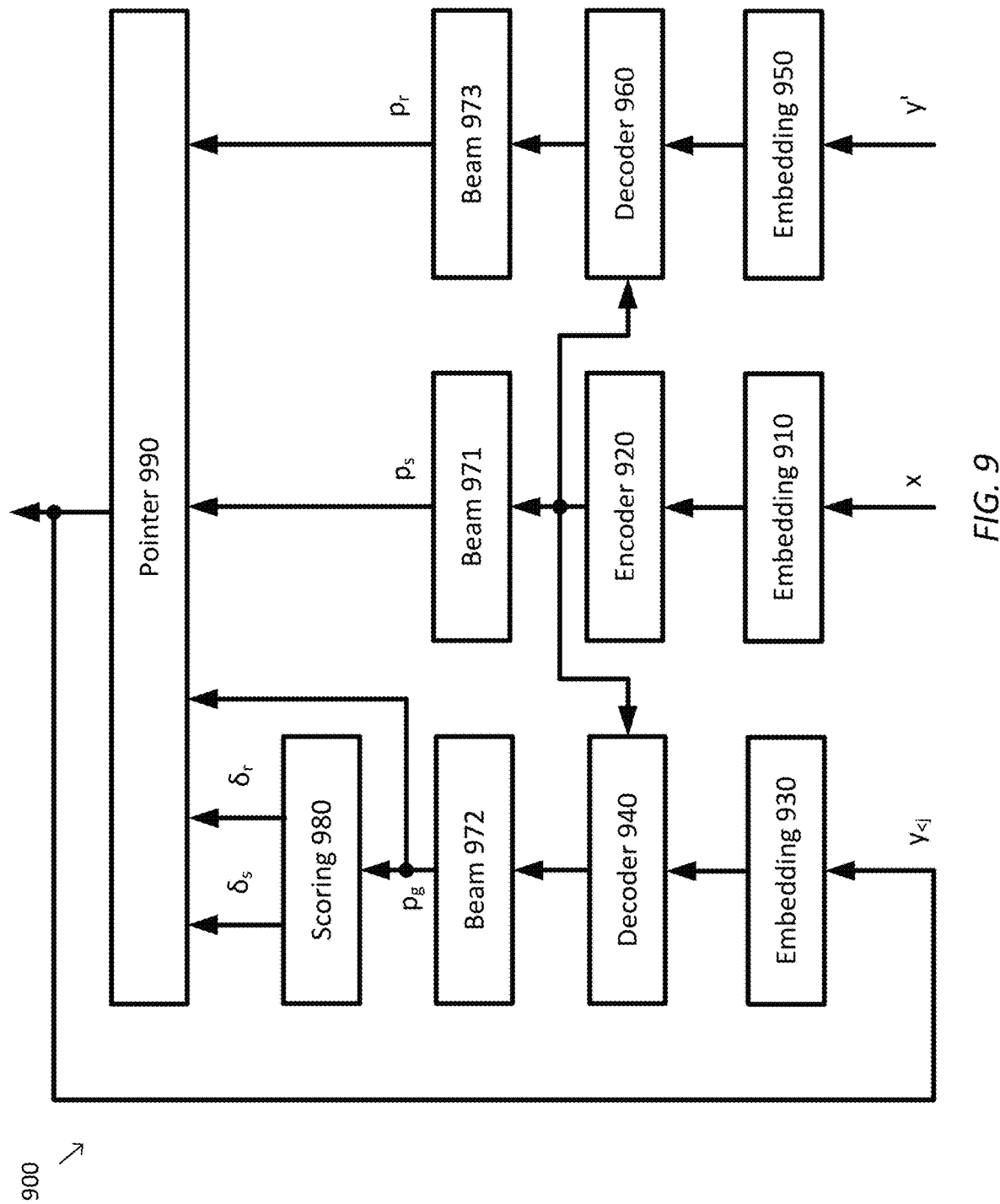
FIG. 9 is a simplified diagram of a structured text translator according to some embodiments.

FIG. 9 is a simplified diagram of a structured text translator 900 according to some embodiments. In some embodiments, structured text translator 900 may be consistent with translation module 130 and/or the translation module of method 400. In some examples, structured text translator 900 is a multi-layer neural network. As shown in FIG. 9, structured text translator 900 receives structured source text as x, which is passed to an embedding module 910 and, after embedding by embedding module 910, is passed to an encoder 920. In some examples, embedding module 910 is consistent with embedding module 510 and/or encoder 920 is consistent with encoder 520. The structured translated text $y_{<j}$ from the previous iterations is passed through an embedding module 930 and, after embedding by embedding module 930, is passed to a decoder 940. In some examples, embedding module 930 is consistent with embedding module 530 and/or decoder 940 is consistent with decoder 540. Structured text translator 900 further selects a training pair (x', y') from the training data whose structured retrieved text x' most closely matches the structured source text x. In some examples, the match may include determining the structured retrieved text x' whose string similarity is closest to structured source text x. In some examples, the closeness of two strings may be determined based on token n-gram matching between x and x'. The structured reference text y' from the training pair is passed through an embedding module 950 and, after embedding by embedding module 950, is passed to a decoder 960. In some examples, embedding module 950 is consistent with embedding module 530 and/or decoder 960 is consistent with decoder 540. The outputs of encoder 920, decoder 940, and decoder 960 are then passed to respective beam modules 971, 972, and 973 to constrain the embedded tags that are recommended by encoder 920, decoder 940, and decoder 960, respectively. In some examples, each of beam modules 971, 972, and 973 are consistent with beam module 550. The output $p_s$ of beam module 971 corresponds to the likelihood that each of the tokens from structured source text x is to be used as the next token in the structured translated text as output by this iteration of structured text translator 900. The output $p_g$ of beam module 972 corresponds to the likelihood that each of the tokens generated by decoder 940 as constrained by beam module 972 are used as the next token in the structured translated text as output by this iteration of structured text translator 900. The output $p_r$ of beam module 973 corresponds to the likelihood that each of the tokens from structured reference text y' is to be used as the next token in the structured translated text as output by this iteration of structured text translator 900.

The output $p_g$ of beam module 970 is passed to a scoring module 980. Scoring module 980 prepends two extra tokens to the output $p_g$ of beam module 972. The first prepended token is used to generate a first score that indicates the likelihood that the next token should not be copied from the structured source text x according to the likelihoods in $p_a$ and is generated based on the output from beam module 972. The second prepended token is used to generate a second score that indicates the likelihood that the next token should not be retrieved from the structured reference text y' according to the likelihoods in $p_r$ and is generated based on the output of beam module 972.

Scoring module 980 then uses a single-head attention network, such as attention network 600, to generate a score or weighting a(j, i) according to Equations 6 and 7, where Q is $p_g$, K is an encoded representation of each of the tokens in $p_g$ as well as the two prepended tokens, and V is the encoded representation of each of the tokens in $p_g$. When the score a corresponding to the first prepended token is the largest among the scores a for all the tokens a value $\delta_s$ is set to 1, otherwise the value $\delta_s$ is set to 0. When the score a corresponding to the second prepended token is the largest among the scores a for the tokens in $p_g$ a value $\delta_r$ is set to 1, otherwise the value $\delta_r$ is set to 0.

The values $\delta_s$ and $\delta_r$ along with the likelihoods $p_g$, $p_s$, and $p_r$ are then passed to a pointer module 990. Pointer module 990 selects the distribution to be used to select the next token in the structured translated text for the current iteration of structured text translator 900 according to an Equation 11. The distribution generated by Equation 11 is then passed to a softmax layer similar to softmax layer 560 to select the next token in the structured translated text for the current iteration of structured text translator 900.

$$(1-\delta_s)p_s + \delta_s((1-\delta_r)p_r + \delta_r p_g) \qquad \text{Equation 11}$$

In some embodiments, structured text translator 900 may be trained using any suitable training function, such as stochastic gradient descent. In some examples, the training data used to train structure text translator 900 may be generated using method 300. In some examples, the loss function L for the training may be consistent with the cross-entropy loss for a weighted sum of multiple distributions. Cross-entropy losses for multiple descriptions are described in further detail in See, et al., "Get to the Point: Summarization with Pointer-Generator Networks," Proceedings of the 55th Annual Meeting of the Association for Computational Linguistics (Volume 1: Long Papers), pages 1073-1083, which is incorporated by reference.

Figure 10:
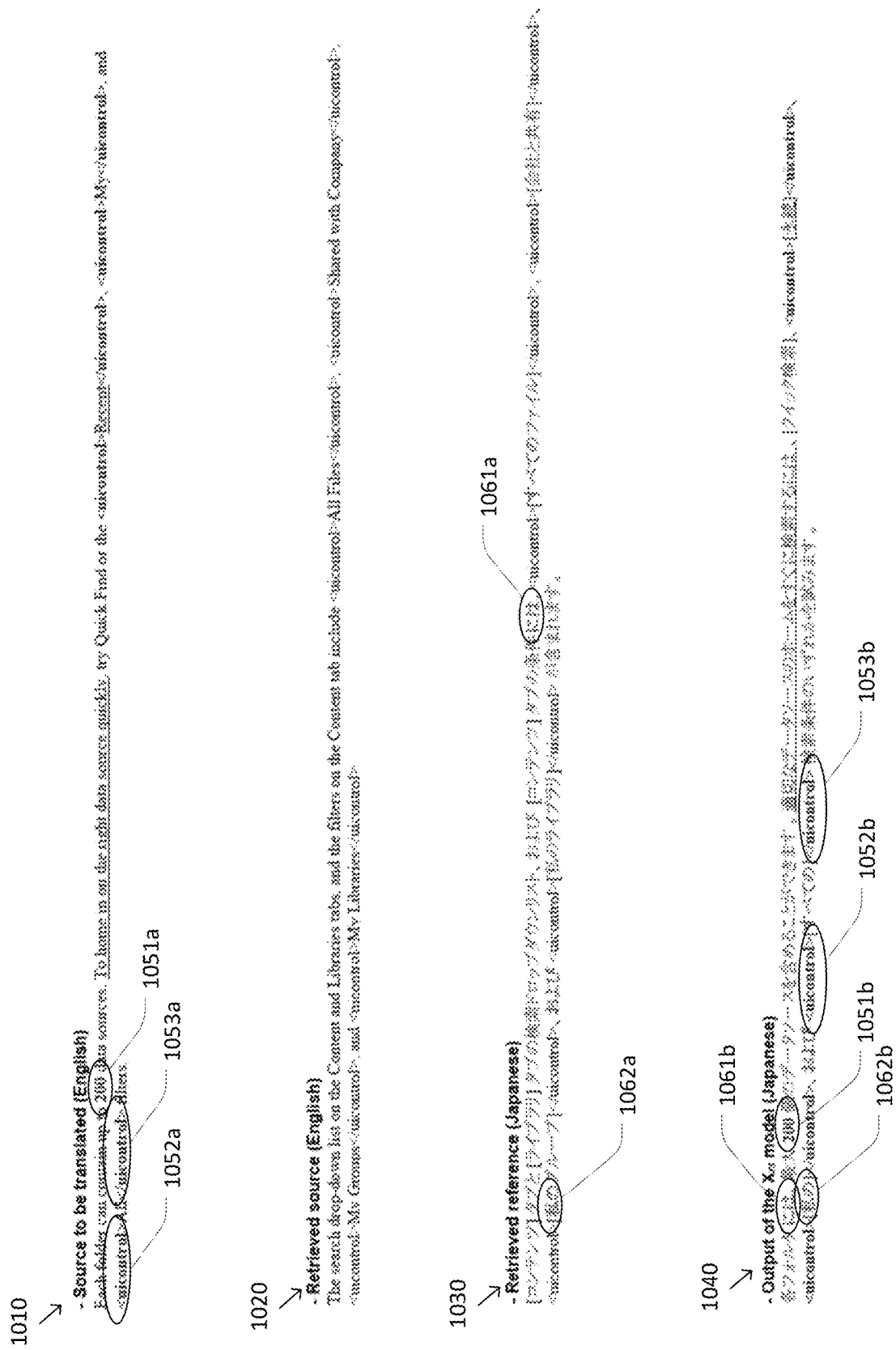
FIG. 10 is a simplified diagram of translated structured text according to some embodiments.

FIG. 10 is a simplified diagram of translated structured text according to some embodiments. In some embodiments, FIG. 10 is consistent with translation by a structured text translator, such as structured text translator 900, which supports the copying of tokens from structured source text and retrieval from a closely matching training pair of structured retrieved text and structured reference text. FIG. 10 shows structured source text 1010 in English (e.g., corresponding to structured source text x), a training pair including retrieved source text 1020 and retrieved reference text 1030 (e.g., corresponding to x' and y', respectively), and structured translated text 1040 in Japanese (e.g., corresponding to structured translated text y). As shown by token pairs 1051a-1051b, 1052a-1052b, and 1053a-1053b, the tokens "200", "<uicontrol>", and "</uicontrol>" represent three of the tokens copied from structured source text 1010 to structured translated text 1040. Note that two of these copied tokens correspond to opening and closing embedded tags "<uicontrol>" and "</uicontrol>", respectively. As shown by token pairs 1061a-1061b and 1062a-1062b several tokens are copied from retrieved reference text 1030 to structured translated text 1040.

FIGS. 11A-11E are simplified diagrams of the results of structured text translation according to some embodiments. As shown, FIGS. 11A-11E show the results for translation between various language pairs (English to Japanese, English to Chinese (Simplified Chinese), English to French, English to German, English to Finnish, English to Dutch, English to Russian, and Finnish to Japanese) for various language translators. The training and testing data used to generate the results shown in FIGS. 11A-11E is prepared according to method 300 and as further described below.

A text only translator ("OT") is shown as a baseline for the displayed metrics. The text only translator is a natural language translator trained and tested on the same training and testing pairs, but without using additional structures or knowledge to address the embedded XML tags in the source and translated text. A first structured text translator ("X") is based on structured text translator 500. A second structured text translator ("Xrs") is based on structured text translator 900 with support for both copying from the structured source text and retrieved from the structured reference text. Results for the second structured text translator with metrics derived from a test set of text pairs ("Xrs(T)") is also provided as a baseline for comparing structured text translator 900 against future structured text translators. The SentencePiece toolkit is used for sub-word tokenization and detokenization for the translated text outputs. The SentencePiece toolkit is described in further detail in Kudo, et al. "SentencePiece: A Simple and Language Independent Subword Tokenizer and Detokenizer for Neural Text Processing," Proceedings of the 2018 Conference on Empirical Methods in Natural Language Processing: System Demonstrations, pages 66-71, which is incorporated by reference.

FIG. 11A shows the results of the various translators for the eight language pairs as evaluated according to the BLEU score and an evaluation of named entity and numbers (NE&NUM) score of precision and recall in the translation when the embedded XML tags are removed. As shown in FIG. 11A, the comparison of the metrics for OT and X show that using the embedded XML tags tends to improve the BLEU scores. This is not surprising because the embedded XML tags provide information about explicit or implicit alignments of phrases between the source and translated text. However, the BLEU score of the English-to-Finnish task significantly drops, which indicates that for some languages it is not easy to handle the embedded XML tags within the text. The metrics for Xrs show that Xrs achieves the best BLEU scores, except for English-to-French. The improvement in the BLEU score comes from using tokens from the structured reference text, but use of this retrieval also degrades the NE&NUM scores, especially for the precision component. However, copying tokens from the structured source text tends to help recover the NE&NUM scores, especially for the recall component. It is also observed that improving the BLEU scores by use of the constrained beam search degrades the NE&NUM scores. Thus, it appears that improving a translator to improve BLEU scores tends to reduce NE&NUM scores.

FIG. 11B shows the results of the X and Xrs translators for the eight language pairs as evaluated according to the BLEU score and an evaluation of accuracy and match in the embedded XML tags in the translation when the embedded XML tags are retained in the source and translated pairs. As shown in FIG. 11B, the Xrs translator performs the best in terms of the XML-based BLEU scores, but the scores are lower than those in FIG. 11A due to the more rigid segment-by-segment comparisons with the use of the embedded XML tags. FIG. 11B also shows that the XML accuracy and matching scores are higher than 99% in most of the cases. In additional experiments where the constrained beam search by the beam modules is omitted, the XML accuracy and matching scores of the X model for English-to-Japanese are 98.70% and 98.10%, respectively. The XML-based BLEU score then decrease from 59.77 to 58.02. This demonstrates that the X and Xrs translators are able to accurately generate the relevant XML structures in the structured translated text.

FIG. 11C shows the results of evaluating the dataset and translators using the online help as a seed corpus for domain adaptation to data pairs from a translated news dataset. More specifically, FIG. 11C shows the effects on English to French translation when 10,000 or 20,000 training examples from the News Commentary corpus are incorporated in the training of the Xrs translator. The results are shown for BLEU scores when testing against the online help dataset with additional training from the News Commentary corpus (left column) and when testing against out-of-domain testing pairs from the newstest2014 dataset. As FIG. 11B shows, the use of even small amounts of the news-domain training pairs improves the out-of-domain translating capability of the Xrs translator.

FIG. 11D shows the results of evaluation of the translation results for the Xrs translator by professional translators. Professional translators evaluated the translation results for structured text including the embedded XML tags for the English to Finnish, French, German, and Japanese translations. 500 text examples were randomly selected and each translation example is given an integer score in [1, 4]. A translation result is rated as "4" if it can be used without any modifications, "3" if it needs simple post-edits, "2" if it needs more post edits but is better than nothing, and "1" if using it is not better than translating from scratch. FIG. 11D shows the distribution of evaluation scores 1, 2, 3, or 4 for each of the target languages, with the average score shown as well. A positive observation for each of the four languages is that more than 50% of the translation results are evaluated as complete (4) or useful in post-editing (3). However, there are still many low-quality translation results; for example, around 30% of the Finnish and German results are evaluated as useless (1). Moreover, the German results have less "4"

scores, and it took additional time (20 percent longer) for the professional translators to evaluate the German results relative to the other three languages.

The professional translators also noted what kinds of errors exist for each of the evaluated examples. The errors are classified into the six types shown in FIG. 11E and each example can have multiple errors. The "Formatting" type error is task-specific and related to whether the embedded XML tags are correctly inserted into the structured translated text. The Finnish results have more XML-formatting errors, and this result agrees with the finding that handling the embedded XML tags in Finnish is harder than in other languages. The "Accuracy" type error covers issues of language translation, such as adding irrelevant words, skipping important words, and mistranslating phrases. The accuracy errors also slowed down the evaluation by the professional translators because the accuracy errors are typically different from accuracy translation errors made by human translators. The other types of errors may also be reduced by improving language models based on in-domain monolingual corpora that can be incorporated into the translator.

Some examples of computing devices, such as computing device 100 may include non-transitory, tangible, machine readable media that include executable code that when run by one or more processors (e.g., processor 110) may cause the one or more processors to perform the processes of methods 300 and/or 400, algorithm 800, and/or the neural network structures 500, 600, 700, and/or 900. Some common forms of machine readable media that may include the processes of methods 300 and/or 400, algorithm 800, and/or neural network structures 500, 600, 700, and/or 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

EXAMPLES

Example 1. A method for preparing training data, the method including:
 obtaining a first structured text in a first language;
 obtaining a second structured text, the second structured text being a translation of the first structured text in a second language different from the first language;
 parsing the first structured text to identify a plurality of first embedded tags;
 parsing the second structured text to identify a plurality of second embedded tags;
 for each of the first embedded tags, identifying a corresponding matching embedded tag from the second embedded tags;
 extracting a third structured text from the first structured text and a corresponding fourth structured text from the second structured text based on a third embedded tag from the first embedded tags and a corresponding fourth embedded tag from the second embedded tags;
 checking the third structured text and the fourth structured text for a consistent structure; and
 adding the third structured text and the fourth structured text as a training pair to a training data repository associated with the first language and the second language.

Example 2: The method of example 1, further including:
 processing each of the first embedded tags based on a respective type of each of the first embedded tags before extracting the third structured text; and/or
 processing each of the second embedded tags based on a respective type of each of the second embedded tags before extracting the fourth structured text.

Example 3: The method of example 2, wherein the respective type is translatable, transparent, or untranslatable.

Example 4: The method of example 3, wherein processing a fifth embedded tag from the first embedded tags based on the respective type of the fifth embedded tag includes removing the fifth embedded tag from the first structured text when the respective type of the fifth embedded tag is untranslatable.

Example 5: The method of example 3, wherein processing a fifth embedded tag from the first embedded tags based on the respective type of the fifth embedded tag includes using the fifth embedded tag as the third embedded tag when the respective type of the fifth embedded tag is translatable.

Example 6: The method of example 1, further including removing a root tag from the third structured text and/or removing a root tag from the fourth structured text before adding the third structured text and the fourth structured text as the training pair to the training data repository.

Example 7: The method of example 1, further including:
 identifying a first uniform resource locator (URL) in the third structured text;
 identifying a second URL in the fourth structured text corresponding to the first URL; and
 replacing the first URL in the third structured text and the second URL in the fourth structured text with a matching placeholder before adding the third structured text and the fourth structured text as the training pair to the training data repository.

Example 8: The method of example 1, further including removing fine-grained information from the third structured text and/or removing fine-grained information from the fourth structured text before adding the third structured text and the fourth structured text as the training pair to the training data repository.

Example 9: The method of example 8, wherein the fine-grained information corresponds to an attribute of an embedded tag.

Example 10: A system including:
 a memory; and
 one or more processors coupled to the memory and configured to perform the method of any one of examples 1 to 9.

Example 11. A non-transitory machine-readable medium including executable code which when executed by one or more processors associated with a computing device are adapted to cause the one or more processors to perform the method of any one of examples 1 to 9.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for translating structured text, the system comprising:
    an embedding module for encoding and embedding structured source text in a first language;
    a multi-layer attention-based encoder for encoding output of the embedding module;
    a multi-layer attention-based decoder for iteratively:
        receiving output of the multi-layer attention-based encoder and tokens in structured translated text from previous iterations, the structured translated text being in a second language different from the first language; and
        decoding the output of the multi-layer attention-based encoder based on the tokens;
    a beam module for constraining, according to a beam search, output of the multi-layer attention-based decoder with respect to possible embedded tags to include in the structured translated text for a current iteration; and
    a softmax layer for selecting a token to be included in the structured translated text for the current iteration based on output from the beam module.

2. The system of claim 1, wherein the beam module limits the possible embedded tags to one or more of:
    an opening embedded tag selected from one or more embedded tags in the structured source text;
    a closing embedded tag corresponding to an opening embedded tag last selected for inclusion in the structured translated text; or
    an end of sequence embedded tag after each of the one or more embedded tags in the structured source text is selected for inclusion in the structured translated text.

3. The system of claim 1, further comprising:
    a scoring module for determining whether the token selected for inclusion in the structured translated text for the current iteration is selected from the output of the beam module or copied from other structured text; and
    a pointer module including the softmax layer for selecting the token to be included in the structured translated text for the current iteration from the output of the beam module or copied from the other structured text based on the determination of the scoring module.

4. The system of claim 3, wherein the other structured text is the structured source text.

5. The system of claim 4, further comprising a second beam module for constraining, according to a second beam search, the output of the multi-layer attention-based encoder with respect to possible embedded tags to include in the structured translated text for the current iteration when the token to be included in the structured translated text for the current iteration is selected from the structured source text.

6. The system of claim 3, wherein:
    the other structured text is a structured reference text corresponding to a translation in the second language of a structured retrieved text in the first language;
    the structured retrieved text and the structure reference text being selected from a training pair used to train the system; and
    the structured retrieved text being a closest match to the structured source text from among each training pair used to train the system.

7. The system of claim 6, further comprising:
    a second multi-layer attention-based decoder for decoding the structured reference text; and
    a second beam module for constraining, according to a second beam search, output of the second multi-layer attention-based decoder with respect to possible embedded tags to include in the structured translated text for the current iteration when the token to be included in the structured translated text for the current iteration is selected from the structured reference text.

8. The system of claim 1, wherein the structured source text or the structured translated text include one or more embedded XML tags or one or more embedded HTML tags.

9. A method for translating structured text, the method comprising:
    encoding and embedding, by an embedding module, structured source text in a first language;
    encoding output of the embedding module using a multi-layer attention-based encoder;
    receiving, at a multi-layer attention-based decoder, output of the multi-layer attention-based encoder and tokens in structured translated text from previous iterations, the structured translated text being in a second language different from the first language;
    iteratively decoding the output of the multi-layer attention-based decoder, the output of the multi-layer attention-based encoder based on the tokens in the structured translated text from the previous iterations;
    constraining, by a beam module according to a beam search, output of the multi-layer attention-based decoder with respect to possible embedded tags to include in the structured translated text for a current iteration; and
    selecting, by a softmax layer, a token to be included in the structured translated text for the current iteration based on output from the beam module.

10. The method of claim 9, wherein the possible embedded tags are limited to one or more of:
    an opening embedded tag selected from one or more embedded tags in the structured source text;
    a closing embedded tag corresponding to an opening embedded tag last selected for inclusion in the structured translated text; or
    an end of sequence embedded tag after each of the one or more embedded tags in the structured source text is selected for inclusion in the structured translated text.

11. The method of claim 9, further comprising:
  determining, by a scoring module, whether the token selected for inclusion in the structured translated text for the current iteration is selected from the output of the beam module or copied from other structured text; and
  selecting, by a pointer module including the softmax layer, the token to be included in the structured translated text for the current iteration from the output of the beam module or copied from the other structured text based on the determination of the scoring module.

12. The method of claim 11, wherein the other structured text is the structured source text.

13. The method of claim 12, further comprising constraining, by a second beam module according to a second beam search, the output of the multi-layer attention-based encoder with respect to possible embedded tags to include in the structured translated text for the current iteration when the token to be included in the structured translated text for the current iteration is selected from the structured source text.

14. The method of claim 11, wherein:
  the other structured text is a structured reference text corresponding to a translation in the second language of a structured retrieved text in the first language;
  the structured retrieved text and the structure reference text being selected from a training pair used to train for training; and
  the method further comprises:
    selecting the structured retrieved text as a closest match to the structured source text from among each training pair used for training;
    decoding, by a second multi-layer attention-based decoder, the structured reference text; and
    constraining, by a second beam module according to a second beam search, output of the second multi-layer attention-based decoder with respect to possible embedded tags to include in the structured translated text for the current iteration when the token to be included in the structured translated text for the current iteration is selected from the structured reference text.

15. A non-transitory machine-readable medium comprising executable code which when executed by one or more processors associated with a computing device are adapted to cause the one or more processors to perform a method comprising:
  encoding and embedding, by an embedding module, structured source text in a first language;
  encoding output of the embedding module using a multi-layer attention-based encoder;
  receiving, by a multi-layer attention-based decoder, output of the multi-layer attention-based encoder and tokens in structured translated text from previous iterations, the structured translated text being in a second language different from the first language;
  iteratively decoding, by the multi-layer attention-based decoder, the output of the multi-layer attention-based encoder based on the tokens in the structured translated text from the previous iterations;
  constraining, by a beam module according to a beam search, output of the multi-layer attention-based decoder with respect to possible embedded tags to include in the structured translated text for a current iteration; and
  selecting, by a softmax layer, a token to be included in the structured translated text for the current iteration based on output from the beam module.

16. The non-transitory machine-readable medium of claim 15, wherein the possible embedded tags are limited to one or more of:
  an opening embedded tag selected from one or more embedded tags in the structured source text;
  a closing embedded tag corresponding to an opening embedded tag last selected for inclusion in the structured translated text; or
  an end of sequence embedded tag after each of the one or more embedded tags in the structured source text is selected for inclusion in the structured translated text.

17. The non-transitory machine-readable medium of claim 15, wherein the method further comprises:
  determining, by a scoring module, whether the token selected for inclusion in the structured translated text for the current iteration is selected from the output of the beam module or copied from other structured text; and
  selecting, by a pointer module including the softmax layer, the token to be included in the structured translated text for the current iteration from the output of the beam module or copied from the other structured text based on the determination of the scoring module.

18. The non-transitory machine-readable medium of claim 17, wherein the other structured text is the structured source text.

19. The non-transitory machine-readable medium of claim 18, wherein the method further comprises constraining, by a second beam module according to a second beam search, the output of the multi-layer attention-based encoder with respect to possible embedded tags to include in the structured translated text for the current iteration when the token to be included in the structured translated text for the current iteration is selected from the structured source text.

20. The non-transitory machine-readable medium of claim 17, wherein:
  the other structured text is a structured reference text corresponding to a translation in the second language of a structured retrieved text in the first language;
  the structured retrieved text and the structure reference text being selected from a training pair used for training; and
  the method further comprises:
    selecting the structured retrieved text as a closest match to the structured source text from among each training pair used for training;
    decoding, by a second multi-layer attention-based decoder, the structured reference text; and
    constraining, by a second beam module according to a second beam search, output of the second multi-layer attention-based decoder with respect to possible embedded tags to include in the structured translated text for the current iteration when the token to be included in the structured translated text for the current iteration is selected from the structured reference text.

* * * * *